United States Patent
Koop et al.

(10) Patent No.: US 9,321,609 B2
(45) Date of Patent: Apr. 26, 2016

(54) FILAMENT DRIVE MECHANISM FOR USE IN ADDITIVE MANUFACTURING SYSTEM

(71) Applicant: Stratasys, Inc., Eden Prairie, MN (US)

(72) Inventors: Shawn M. Koop, Blaine, MN (US); Peter D. Schuller, Elko, MN (US); Paul J. Leavitt, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 480 days.

(21) Appl. No.: 13/708,116

(22) Filed: Dec. 7, 2012

(65) Prior Publication Data

US 2014/0159273 A1    Jun. 12, 2014

(51) Int. Cl.
| | |
|---|---|
| *B28B 17/00* | (2006.01) |
| *B65H 51/10* | (2006.01) |
| *B29C 47/02* | (2006.01) |
| *B29C 67/00* | (2006.01) |
| *B29C 47/00* | (2006.01) |
| *B29C 47/08* | (2006.01) |

(52) U.S. Cl.
CPC .............. *B65H 51/10* (2013.01); *B29C 47/025* (2013.01); *B29C 67/0055* (2013.01); *B29C 47/0002* (2013.01); *B29C 47/0806* (2013.01); *B29C 47/0823* (2013.01); *B29C 67/0092* (2013.01)

(58) Field of Classification Search
CPC ............................ B65H 51/10; B29C 67/0055
See application file for complete search history.

(56) References Cited

U.S. PATENT DOCUMENTS

| | | | | |
|---|---|---|---|---|
| 3,016,451 | A | * | 1/1962 | Cornell, Jr. .............. 219/137.44 |
| 4,479,347 | A | | 10/1984 | Larsen et al. ................... 56/344 |
| 4,797,313 | A | | 1/1989 | Stolk et al. ..................... 428/156 |
| 5,121,329 | A | | 6/1992 | Crump .......................... 364/468 |
| 5,169,081 | A | | 12/1992 | Goedderz ....................... 242/54 |
| 5,303,141 | A | | 4/1994 | Batchelder et al. ........... 364/149 |
| 5,312,224 | A | | 5/1994 | Batchelder et al. ............. 415/73 |
| 5,340,443 | A | | 8/1994 | Crump .......................... 156/578 |
| 5,342,687 | A | | 8/1994 | Iwai et al. ..................... 428/402 |
| 5,503,785 | A | | 4/1996 | Crump et al. ................. 264/40.7 |
| 5,738,817 | A | | 4/1998 | Danforth et al. .............. 264/603 |
| 5,764,521 | A | | 6/1998 | Batchelder et al. ...... 364/475.01 |
| 5,866,058 | A | | 2/1999 | Batchelder et al. ........... 264/237 |
| 5,900,207 | A | | 5/1999 | Danforth et al. .............. 264/603 |
| 5,939,008 | A | | 8/1999 | Comb et al. ................... 264/308 |
| 5,968,561 | A | | 10/1999 | Batchelder et al. ........... 425/375 |
| 6,004,124 | A | | 12/1999 | Swanson et al. .............. 425/375 |
| 6,022,207 | A | | 2/2000 | Dahlin et al. .................. 425/145 |
| 6,054,077 | A | | 4/2000 | Comb et al. ................... 264/40.7 |
| 6,067,480 | A | | 5/2000 | Stuffle et al. .................. 700/109 |
| 6,070,107 | A | | 5/2000 | Lombardi et al. ............. 700/119 |
| 6,085,957 | A | | 7/2000 | Zinniel et al. ..................... 226/8 |

(Continued)

OTHER PUBLICATIONS

"BFB 3000 Operations manual", Bits From Bytes, bitsfrombytes.com, 2010, pp. 1-60 (see e.g. pp. 16 and 36).

(Continued)

*Primary Examiner* — Galen Hauth

(74) *Attorney, Agent, or Firm* — Westman, Champlin & Koehler, P.A.

(57) ABSTRACT

A filament drive mechanism for use with an additive manufacturing system, the filament drive mechanism comprising first and second drive shafts engaged with each other and configured to rotate in opposing rotational directions around substantially parallel and fixed axes, where the first and second drive shafts include engagement surfaces substantially aligned with each other for engaging a filament therebetween.

20 Claims, 10 Drawing Sheets

(56) References Cited

U.S. PATENT DOCUMENTS

| | | | |
|---|---|---|---|
| 6,129,872 A | 10/2000 | Jang | 264/75 |
| 6,228,923 B1 | 5/2001 | Lombardi et al. | 524/425 |
| 6,257,517 B1 | 7/2001 | Babish et al. | 242/365.6 |
| 6,547,995 B1 | 4/2003 | Comb | 264/40.1 |
| 6,557,742 B1 * | 5/2003 | Bobeczko et al. | 226/186 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,172,715 B2 | 2/2007 | Swanson et al. | 264/39 |
| 7,363,686 B2 | 4/2008 | Fukuyasu et al. | 24/30.5 |
| 7,384,255 B2 * | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 7,896,209 B2 | 3/2011 | Batchelder et al. | |
| 8,153,182 B2 | 4/2012 | Comb et al. | |
| 8,221,669 B2 | 7/2012 | Batchelder et al. | 264/308 |
| 8,236,227 B2 | 8/2012 | Batchelder et al. | |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0018924 A1 | 1/2010 | Fendya et al. | 210/648 |
| 2010/0021580 A1 * | 1/2010 | Swanson et al. | 425/132 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0018924 A1 | 1/2012 | Swanson et al. | |
| 2012/0068378 A1 | 3/2012 | Swanson et al. | 264/308 |
| 2012/0070523 A1 | 3/2012 | Swanson et al. | 425/96 |
| 2012/0164256 A1 | 6/2012 | Swanson et al. | |
| 2013/0078073 A1 | 3/2013 | Comb et al. | |

OTHER PUBLICATIONS

"Plastruder MK5 Assembly", MakerBot Industries, http://wiki.makerbot.com/plastruder-mk5-assembly, last updated on Dec. 8, 2010, pp. 1-52.

* cited by examiner

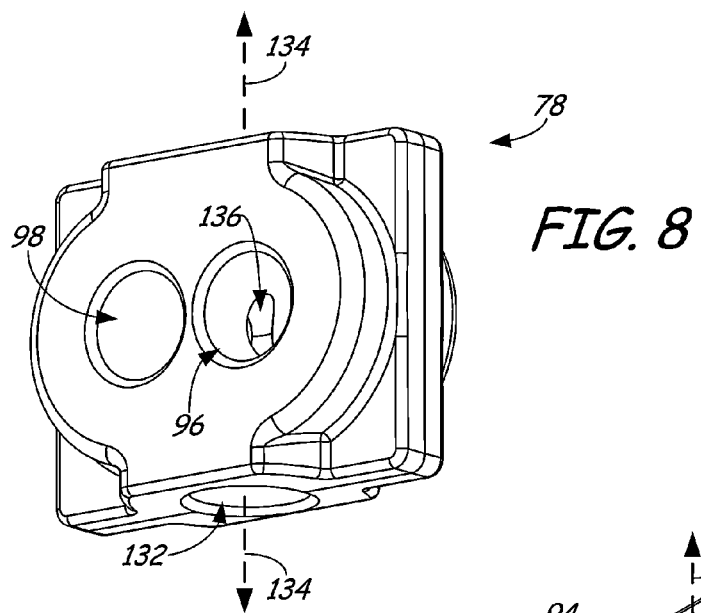
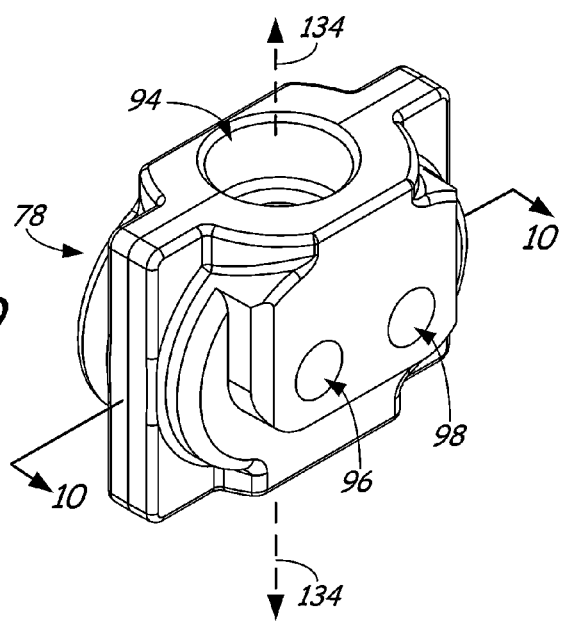
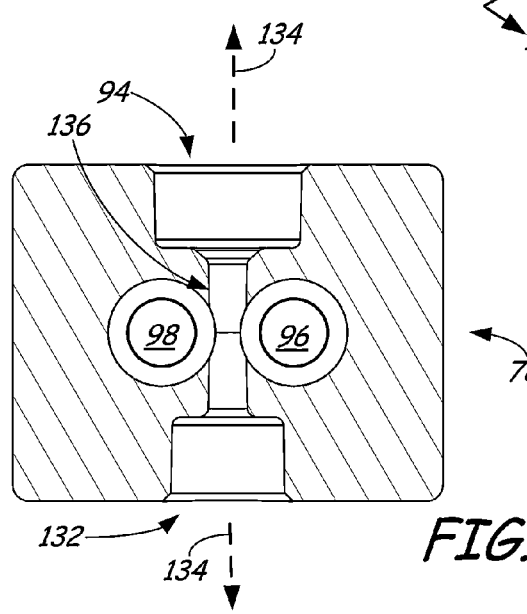

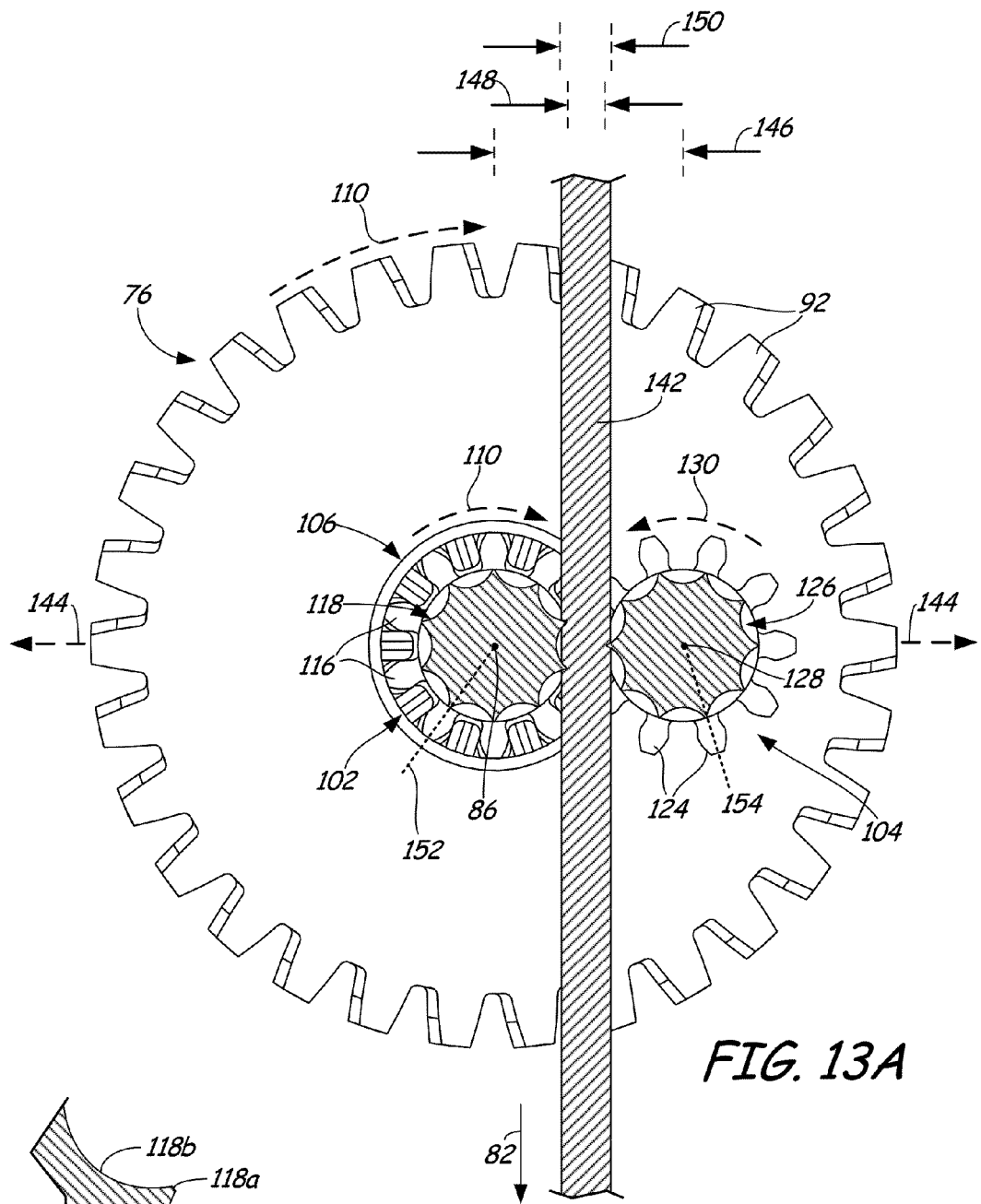
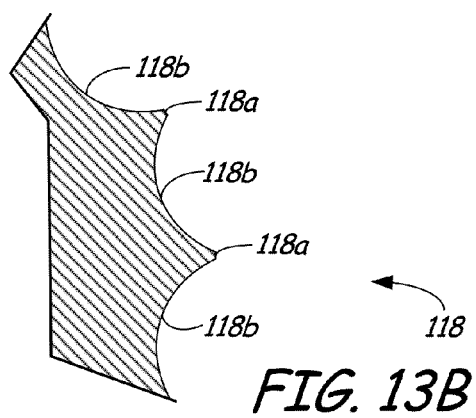
FIG. 13A
FIG. 13B

FILAMENT DRIVE MECHANISM FOR USE IN ADDITIVE MANUFACTURING SYSTEM

BACKGROUND

The present disclosure relates to additive manufacturing systems for printing or otherwise building three-dimensional (3D) parts with layer-based, additive manufacturing techniques. In particular, the present disclosure relates to filament drive mechanisms for use in extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a filament drive mechanism for use with an additive manufacturing system. The filament drive mechanism includes a first drive shaft having a first rotational axis, first gear teeth extending around the first rotational axis, and a first engagement surface extending around the first rotational axis. The filament drive mechanism also includes a second drive shaft having a second rotational axis that is substantially parallel to and fixed relative to the first rotational axis, and further including second gear teeth extending around the second rotational axis and engaged with the first gear teeth, and a second engagement surface extending around the second rotational axis, where the second engagement surface is substantially aligned with the first engagement surface of the first drive shaft for engaging a filament therebetween.

Another aspect of the present disclosure is directed to a print head for use with an additive manufacturing system. The print head includes a cartridge portion, a liquefier assembly extending from the cartridge portion, and a filament drive mechanism disposed in the cartridge portion. The filament drive mechanism includes a first drive shaft extending along a first rotational axis and having a first engagement surface, and a second drive shaft engaged with the first drive shaft and extending along a second rotational axis that is substantially parallel to and fixed relative to the first rotational axis. The second drive shaft has a second engagement surface that is substantially aligned with the first engagement surface of the first drive shaft for engaging a filament therebetween to feed the filament to the liquefier assembly.

Another aspect of the present disclosure is directed to a method for printing a three-dimensional part from a part material with an additive manufacturing system. The method includes providing a first draft shaft and a second drive shaft engaged with each other, and engaged on opposing sides of a filament of the part material, and rotating the first drive shaft around a first axis in a first rotational direction. The method also includes rotating the second drive shaft by the engagement between the first and second drive shafts, where the second drive shaft rotates around a second axis in a second rotational direction that is counter to the first rotational direction, the second axis being substantially parallel and fixed relative to the first axis, and where the rotations of the first and second drive shafts drive the engaged filament.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 8 is a bottom, front perspective view of a drive block of the filament drive mechanism.

FIG. 9 is a top, rear perspective view of the drive block.

FIG. 10 is a sectional view of section 10-10 taken in FIG. 9, illustrating a filament channel of the drive block.

FIG. 13A is a sectional view of section 13-13 taken in FIG. 12, illustrating the engagement between the filament drive mechanism and the consumable filament.

FIG. 13B is an expanded sectional view of a portion of an engagement surface of the first drive shaft.

DETAILED DESCRIPTION

The present disclosure is directed to a filament drive mechanism for use with an additive manufacturing system for drawing and feeding consumable filaments, such as part and support material filaments. The drive mechanism is preferably a sub-component of a print head, where the print head is retainable by an additive manufacturing system for printing 3D parts and/or support structures in a layer-by-layer manner. Alternatively, as discussed below, the drive mechanism may be located upstream from the print head along a filament pathway of the additive manufacturing system, such as in a consumable assembly or a coupling adapter.

Figure 1:
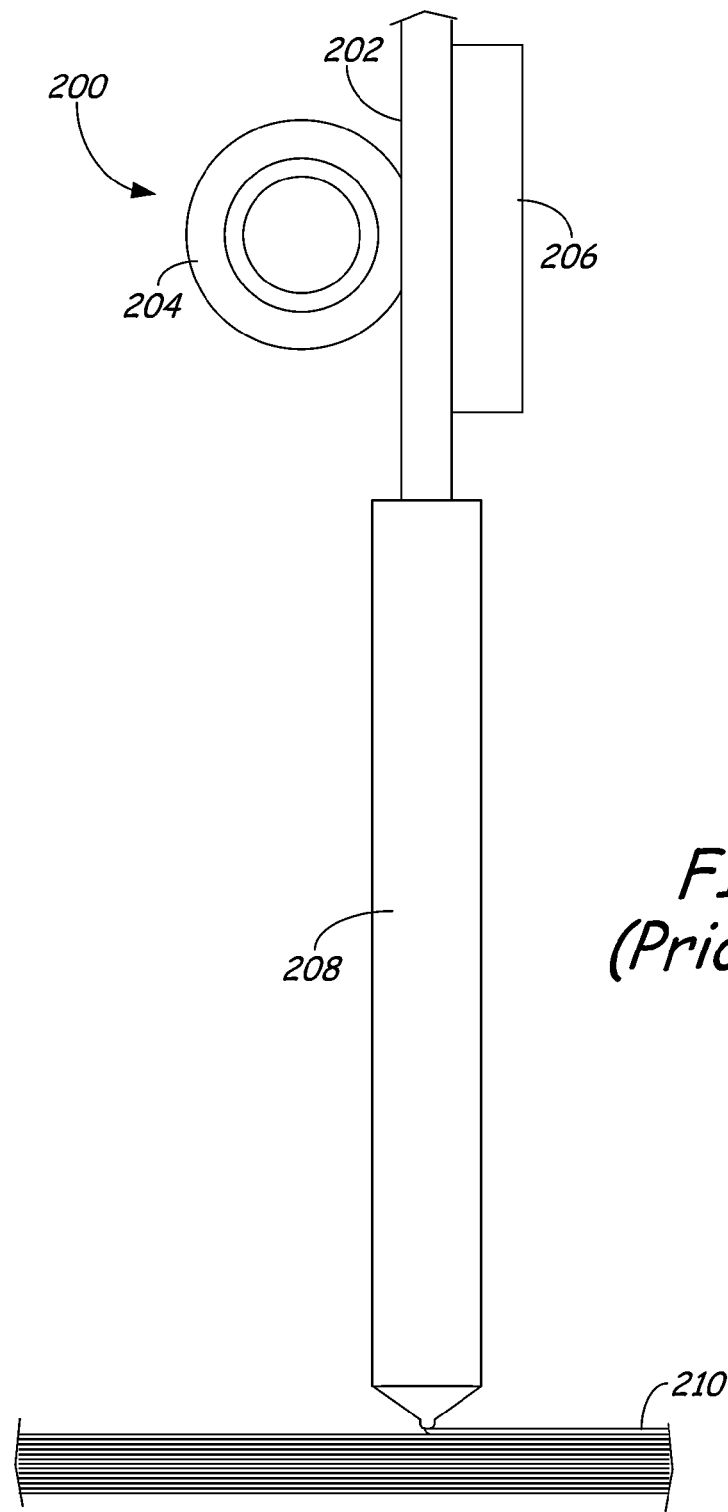
FIG. 1 is a schematic illustration of a conventional filament drive mechanism and liquefier assembly in use with a consumable filament to print a 3D part.

As shown in FIG. 1, a conventional filament drive mechanism 200 may engage a consumable filament 202 with drive wheel 204 and bearing surface 206, where bearing surface 206 may alternatively be an idler wheel. The engaged drive wheel 204 feeds filament 202 into a liquefier assembly 208, where the filament 202 is melted. The unmelted portion of filament 202 provides a viscosity-pump action to extrude the molten filament material from liquefier assembly 208 to print a 3D part 210, where the extrusion rate is based on the feed rate of filament 202 into liquefier assembly 208, such as discussed in Comb, U.S. Pat. No. 6,547,995.

The feed rate of filament 202 into liquefier assembly 208 is correspondingly based on the rotational rate of drive wheel 204. Thus, printing operation is dependent on the engagement between filament 202 and drive wheel 204. If filament 202 slips relative to drive wheel 204, this filament slippage can disrupt the extrusion rate of the filament material from liquefier assembly 208. For example, filament slippage can occur when filament 202 is subjected to back pressures within liquefier assembly 208 that exceed the frictional grip that drive wheel 204 has on filament 202. If this occurs, the change in the extrusion rate of the filament material may impair the quality of 3D part 210.

Accordingly, as discussed below, the filament drive mechanism of the present disclosure is capable of feeding consumable filaments with reduced risks of filament slippage. Briefly, the drive mechanism includes a pair of fixed-axis, counter-rotating drive shafts that are configured to continuously engage a consumable filament to feed it a liquefier assembly of a print head. This provides several advantages for 3D printing operations, such as higher drive pressures, lower liquefier temperatures, and stall recoveries. Additionally, the filament drive mechanism preferably has a compact design, allowing it to be incorporated as a sub-component in a print head, consumable assembly, coupling adapter, and/or any other suitable location along the filament pathway.

Figure 2:
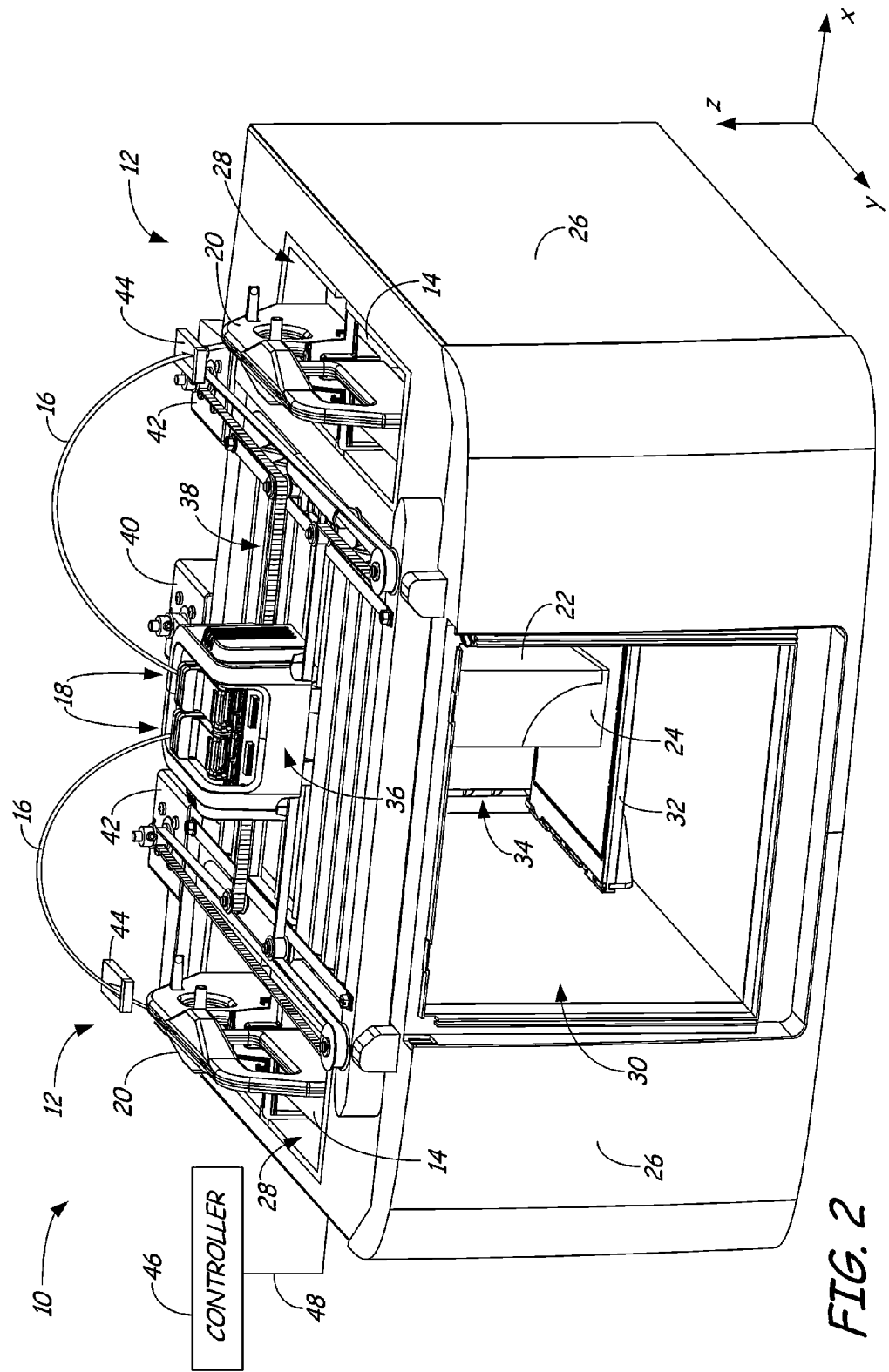
FIG. 2 is a top, front perspective view of an additive manufacturing system in use with consumable assemblies, which includes a filament drive mechanism of the present disclosure.

FIG. 2 shows system 10 in use with two consumable assemblies 12, where each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, print head 18, and handle 20, where each print head 18 preferably includes a filament drive mechanism of the present disclosure. Container portion 14 may retain a spool or coil of a consumable filament, such as discussed in Mannella et al., U.S. patent application Ser. No. 13/334,910 and Ser. No. 13/334,921. Guide tube 16 interconnects container portion 14 and print head 18, where the drive mechanism of print head 18 draws successive segments of the consumable filament from container portion 14 and through guide tube 16.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosed environment that contains platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may also include a flexible polymeric film or liner on which 3D part 22 and support structure 24 are printed. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. Publication Nos. 2010/0283172 and 2012/0164256.

In the shown embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. patent Ser. No. 13/242,561.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 22 and support structure 24 along the x-axis or the y-axis.

As further shown in FIG. 2, system 10 may also include a pair of sensor assemblies 44, which, in the shown embodiment, are located adjacent to bays 28. Sensor assemblies 44 are configured to receive and retain guide tubes 16, while also providing sufficient ranges of movement for guide tubes 16 and print heads 18. Sensor assemblies 44 are also configured to read encoded markings from successive segments of the consumable filaments moving through guide tubes 16. Examples of suitable devices for sensor assemblies 44 include those disclosed in Batchelder et al., U.S. Patent Application Publication Nos. 2011/0117268, 2011/0121476, and 2011/0233804.

System 10 also includes controller 46, which is one or more control circuits configured to monitor and operate the components of system 10. For example, one or more of the control functions performed by controller 46 can be implemented in hardware, software, firmware, and the like, or a combination thereof. Controller 46 may communicate over communication line 48 with print heads 18, chamber 30 (e.g., with a heating unit for chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10. System 10 and/or controller 46 may also communicate with one or more computer-based systems (not shown), which may include computer-based hardware, such as data storage devices, processors, memory modules and the like for generating, storing, and transmitting tool path and related printing instructions to system 10.

During operation, controller 46 may direct z-axis motor 40 and platen gantry 34 to move platen 32 to a predetermined height within chamber 30. Controller 46 may then direct motors 42 and head gantry 38 to move head carriage 36 (and the retained print heads 18) around in the horizontal x-y plane above chamber 30. Controller 46 may also direct the filament drive mechanisms of the present disclosure, located in print heads 18, to selectively draw successive segments of the consumable filaments from container portions 14 and through guide tubes 16, respectively.

Each print head 18 thermally melts the successive segments of the received consumable filament such that it becomes a molten material, thereby allowing the molten material to be extruded and deposited onto platen 32 for printing 3D part 22 and support structure 24 in a layer-by-layer manner. After the print operation is complete, the resulting 3D part 32 and support structure 24 may be removed from chamber 30, and support structure 24 may be removed from 3D part 22. 3D part 22 may then undergo one or more additional post-processing steps.

Figure 3A:
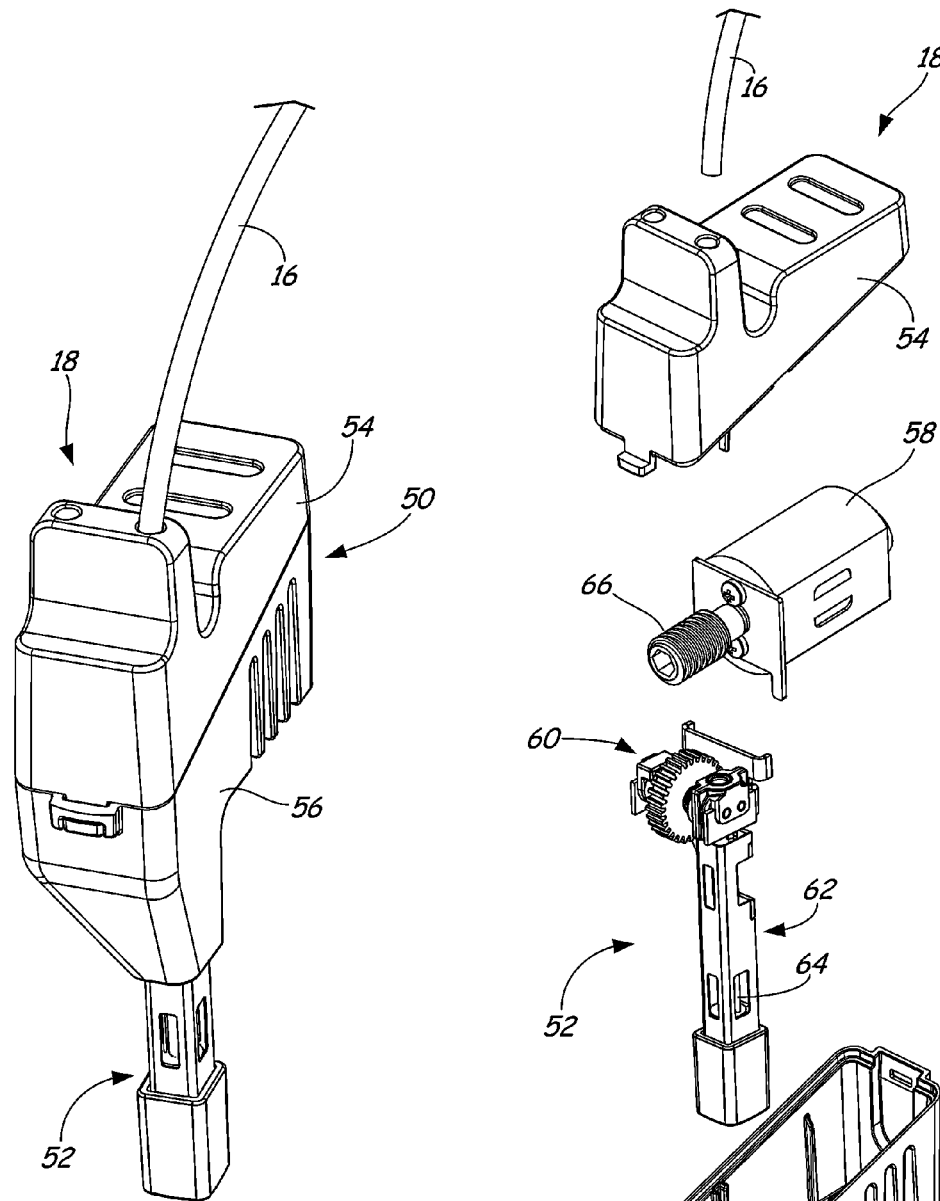
FIG. 3A is a perspective view of a print head and guide tube for use with the additive manufacturing system, where the print head includes the filament drive mechanism.
Figure 3B:
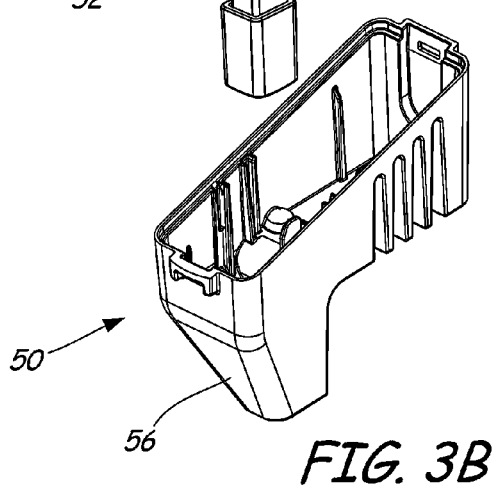
FIG. 3B is an exploded perspective view of the print head, showing a pump assembly that includes the filament drive mechanism.

FIGS. 3A and 3B illustrate an example embodiment of print head 18, which includes a filament drive mechanism of the present disclosure. As shown in FIG. 3A, print head 18 includes cartridge assembly 50 and pump assembly 52, where a rear portion of cartridge assembly 50 may be retained by head carriage 36 (shown in FIG. 2) such that pump assembly 52 extends downward from a front portion of cartridge assembly 50. In the shown embodiment, cartridge assembly 50 includes upper housing cover 54 and housing body 56, which may be secured to together during use.

As shown in FIG. 3B, print head 18 may also include motor 58, where motor 58 may be fully encased within housing cover 54 and housing body 56. As further shown, pump assembly 52 is partially encased within housing cover 54 and housing body 56, and includes filament drive mechanism 60 of the present disclosure, backbone assembly 62, and liquefier assembly 64. Liquefier assembly 64 is preferably encased by backbone assembly 62, and filament drive mechanism 60 may be retained by backbone assembly 62 at an upstream location relative to liquefier assembly 64.

Motor 58 is configured to receive electrical power from system 10 via electrical connections (not shown) for rotating gear 66. Gear 66 is a threaded-surface gear that is axially connected to motor 58 to receive the generated rotational power. Gear 66 correspondingly engages filament drive mechanism 60 to relay the rotational power to filament drive mechanism 60.

Examples of suitable components for cartridge assembly 50, motor 58, backbone assembly 62, and liquefier assembly 64 include those discussed in Swanson et al., U.S. Publication No. 2012/0164256, which is incorporated by reference in its entirety to the extent that it does not conflict with the present disclosure. Additionally, further examples of suitable components for liquefier assembly 64 include those disclosed in co-filed U.S. patent application Ser. No. 13/708,037, filed Dec. 7, 2012, entitled "Liquefier Assembly For Use In Additive Manufacturing System", which is incorporated by reference in its entirety to the extent that it does not conflict with the present disclosure.

Figure 4:
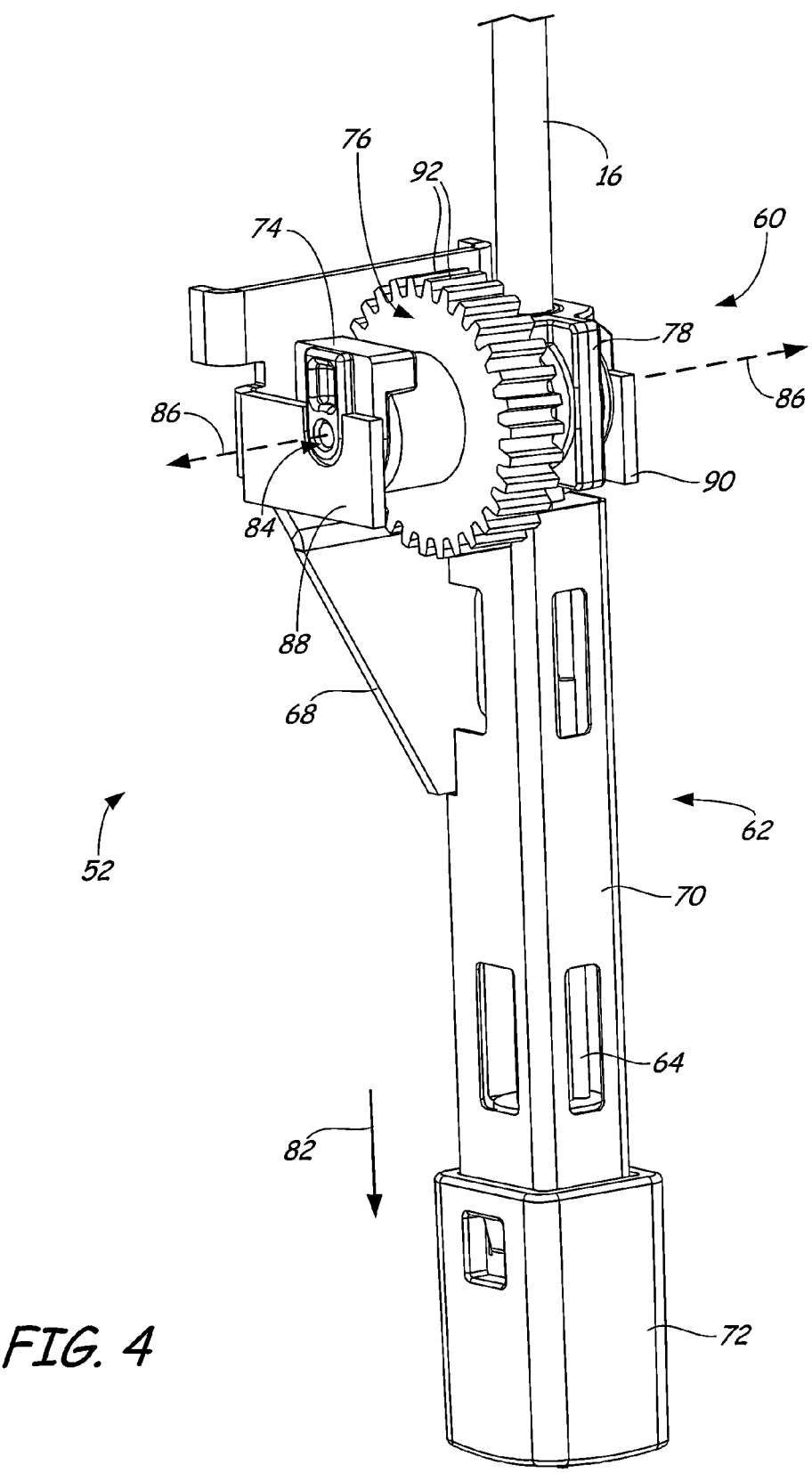
FIG. 4 is a perspective view of the pump assembly, showing the filament drive mechanism.

FIG. 4 further illustrates pump assembly 52 in use with guide tube 16. As shown, backbone assembly 62 is a structure component of pump assembly 52 and includes backbone plate 68 and heat shield 70, as discussed in Swanson et al., U.S. Publication No. 2012/0164256, and also includes tip shield 72.

Filament drive mechanism 60 is preferably configured to feed successive portions of a consumable filament (not shown) from guide tube 16 to liquefier assembly 64 with high margins against filament slippage. In other words, filament drive mechanism 60 is preferably capable of feeding consumable filaments with higher drive pressures compared to filament drive mechanism 200 (shown in FIG. 1), and can tolerate higher pressure fluctuations without filament slippage.

Filament drive mechanism 60 includes bearing block 74, capstan gear 76, and drive block 78, which are located upstream from liquefier assembly 64. As used herein, the terms "upstream" and "downstream" are made with reference to a filament feed direction, such as along arrow 82, for example. Bearing block 74, capstan gear 76, and drive block 78 may each be molded or cast from one or more metallic and/or plastic materials.

Bearing block 74 includes lateral opening 84 that is preferably co-linear with a rotational axis of capstan gear 76 (referred to as axis 86). Capstan gear 76 is operably supported by bearing block 74 and drive block 78, which are respectively retained by retention arms 88 and 90 of backbone plate 68. Capstan gear 76 includes perimeter teeth 92, which are gear teeth or an otherwise textured surface that extend around the outer perimeter of capstan gear 76, and are the portion of filament drive mechanism 60 that engage with the threaded surface of gear 66 (shown above in FIG. 3B).

Figure 5:
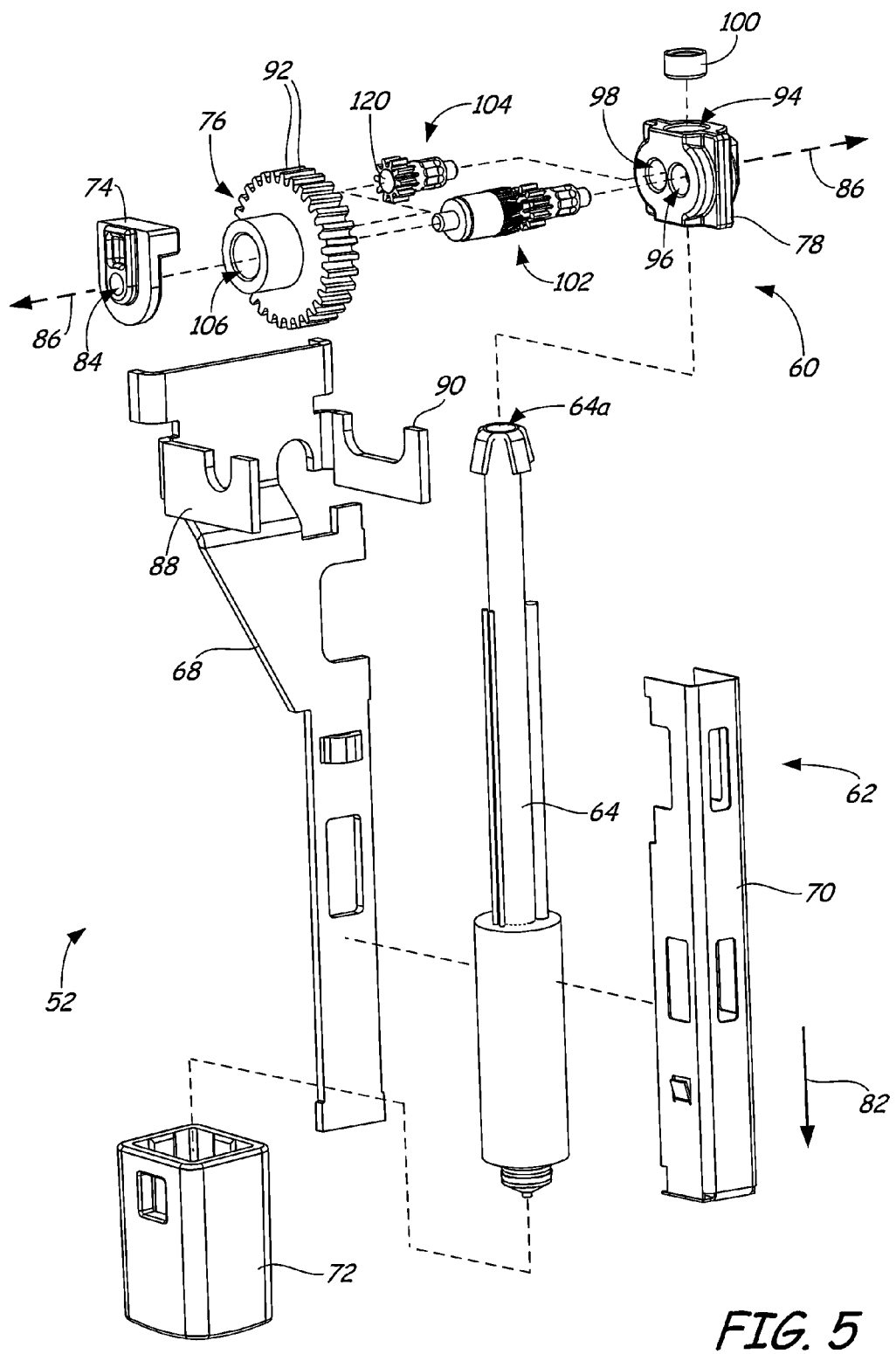
FIG. 5 is an exploded perspective view of the pump assembly and the filament drive mechanism.

Drive block 78 is the component through which the consumable filament passes while being fed from guide tube 16 into liquefier assembly 64. As shown in FIG. 5, drive block 78 includes top opening 94, and a pair of lateral openings 96 and 98. Top opening 96 is an inlet opening of drive block 78 that is configured to retain seal ring 100. Seal ring 100 is a gasket that preferably restricts or prevents moisture from entering guide tube 16 and drive block 78, and may be fabricated from one or more plastic and/or rubber-based materials. In alternate embodiments, including but not limited to embodiments wherein moisture entering the liquefier is not a concern, seal ring 100 may be omitted. Guide tube 16 engages drive block 78 at seal ring 100 within top opening 94. As discussed below, drive block 78 also includes a bottom outlet opening (not shown in FIG. 5) configured to engage an inlet end of liquefier assembly 64 (referred to as inlet end 64a).

As further shown in FIG. 5, filament drive mechanism 60 also includes drive shafts 102 and 104, each of which may be molded or cast from one or more metallic and/or plastic materials. Drive shaft 102 is a first or master drive shaft that extends through and is secured to (or integral with) an axial opening of capstan gear 76 (referred to as axial opening 106). As such, capstan gear 76 and drive shaft 102 rotate in the same direction around the same axis 86. Drive shaft 102 also rotat- ably engages bearing block 74 at lateral opening 84, and drive block 78 at lateral opening 96.

Drive shaft 104 is a second or slaved drive shaft that is parallel to drive shaft 102, and rotatably engages drive block 78 at lateral opening 98. As discussed below, drive shaft 104 is engaged with drive shaft 102 in a counter-rotating manner, where the rotation of drive shaft 102 around axis 86 rotates drive shaft 104 in a counter-rotational direction parallel to axis 86. This provides a fixed-axis rotation for each of drive shafts 102 and 104 for engaging and feeding a consumable filament through drive block 78, where the axes of drive shafts 102 and 104 are preferably not spring loaded to reduce the dimensions of filament drive mechanism 60.

Figure 6:
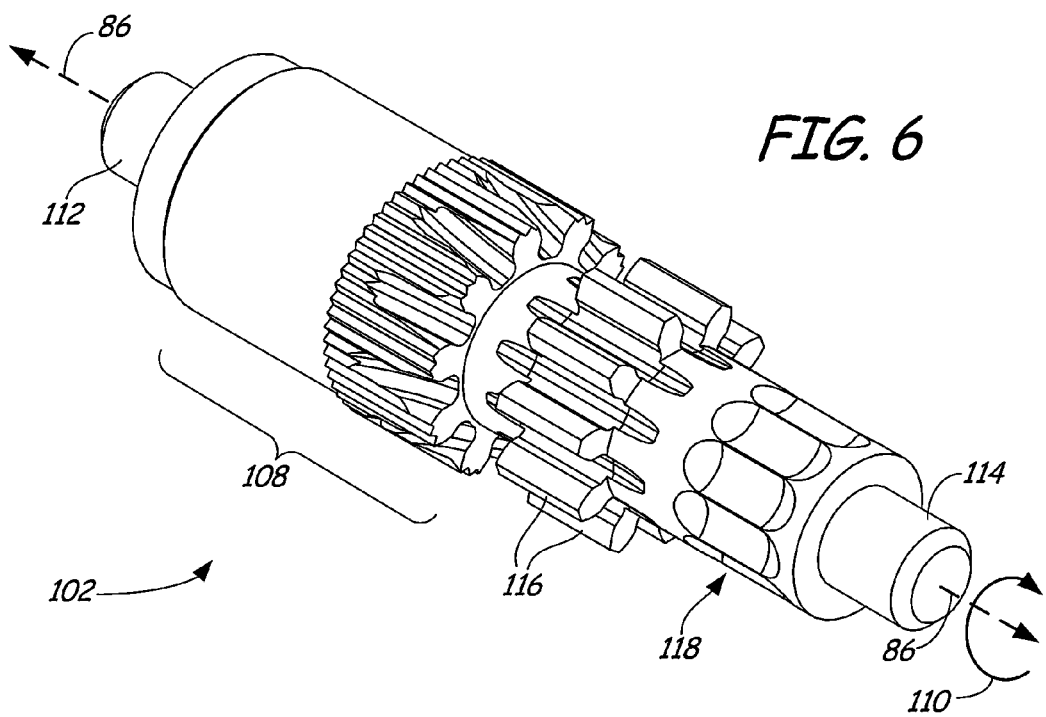
FIG. 6 is a perspective view of a first or master drive shaft of the filament drive mechanism.

As shown in FIG. 6, drive shaft 102 includes coupling segment 108, which is the portion of drive shaft 102 secured within axial opening 106 of capstan gear 76, such as with frictional fitting, welding, adhesives, and the like. This allows the rotation of capstan gear 76 around axis 86 to correspondingly rotate drive shaft 102 in the same rotational direction, such as in the rotational direction of arrow 110. In an alternative embodiment, capstan gear 76 and drive shaft 102 may be fabricated as a single component in which drive shaft 102 extends from the axial center of capstan gear 76.

Drive shaft 102 also includes bearing-end axle 112 and drive-end axle 114, where bearing-end axle 112 extends into lateral opening 84 of bearing block 74, and drive-end axle 114 extends into lateral opening 96 of drive block 78. This mounts drive shaft 102 (and capstan gear 76) to bearing block 74 and drive block 78, and allows drive shaft 102 and capstan gear 76 to freely rotate under the rotational power from gear 66 of motor 58 (shown above in FIG. 3B).

Drive shaft 102 also includes gear teeth 116 and engagement surface 118. Gear teeth 116 are a series of teeth extending radially around drive shaft 102 for engagement with reciprocating gear teeth of drive shaft 104, as discussed below. Engagement surface 118 is a first textured surface that engages the consumable filament within drive block 78. As shown, engagement surface 118 is preferably a linearly-knurled surface with a plurality of teeth extending radially around drive shaft 102. Alternatively, engagement surface 118 may include different textures, such as radial gear teeth, diamond knurling, and the like.

Figure 7:
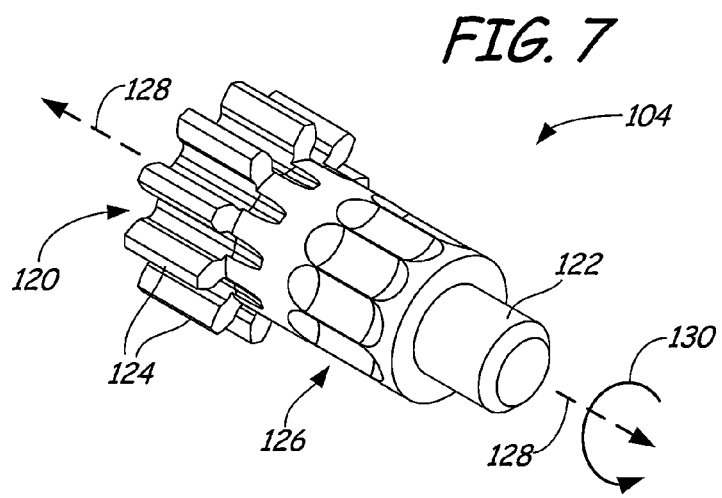
FIG. 7 is a perspective view of a second or slaved drive shaft of the filament drive mechanism.

Similarly, as shown in FIG. 7, drive shaft 104 includes end surface 120 (also shown above in FIG. 5) and drive-end axle 122, where end surface 120 rests against capstan gear 76, and drive end axle 122 extends into lateral opening 98 of drive block 78. This mounts drive shaft 104 between capstan gear 76 and drive block 78, where drive shaft 102 is not directly coupled to capstan gear 76.

Drive shaft 104 also includes gear teeth 124 and engagement surface 126, which may be identical to gear teeth 116 and engagement surface 118 of drive shaft 102, and preferably have the same cross-sectional dimensions. Gear teeth 124 are a series of teeth extending radially around drive shaft 104 relative to its rotational axis (referred to as axis 128). When drive shafts 102 and 104 are inserted into drive block 78, gear teeth 116 and 124 are engaged, which allows the rotation of drive shaft 102 around axis 86 (e.g., in the rotational direction of arrow 110) to counter rotate drive shaft 104 around axis 128 (e.g., in the direction of arrow 130).

Engagement surface 126 is a second textured surface that also engages the consumable filament within drive block 78. As shown, engagement surface 126 is preferably a linearly-knurled surface with a plurality of teeth extending radially around drive shaft 104. Alternatively, engagement surface 126 may include different textures, such as radial gear teeth, diamond knurling, and the like, and preferably includes the same texturization as engagement surface 118.

FIGS. 8-10 further illustrate a suitable embodiment for drive block 78. As shown in FIG. 8, drive block 78 also includes bottom opening 132, which is an opposing opening from top opening 94 along axis 134 (e.g., as depicted in FIG. 9), and is the opening in which inlet end 64a of liquefier assembly 64 may engage drive block 78.

As best shown in FIG. 10, top opening 94 and bottom opening 132 are interconnected via channel 136 (also shown in FIG. 8), which extends along axis 134 and is the channel through which a consumable filament passes (optionally through successive segments of guide tube 16) to liquefier assembly 64. Channel 136 is exposed to lateral openings 96 and 98 at a location between top opening 94 and bottom opening 132. When drive shafts 102 and 104 are inserted into lateral openings 96 and 98 of drive block 78, engagement surfaces 118 and 126 align on opposing sides of channel 136. This allows engagement surfaces 118 and 126 to engage the consumable filament in channel 136 for feeding successive segments of the filament into liquefier assembly 64.

Figure 11:
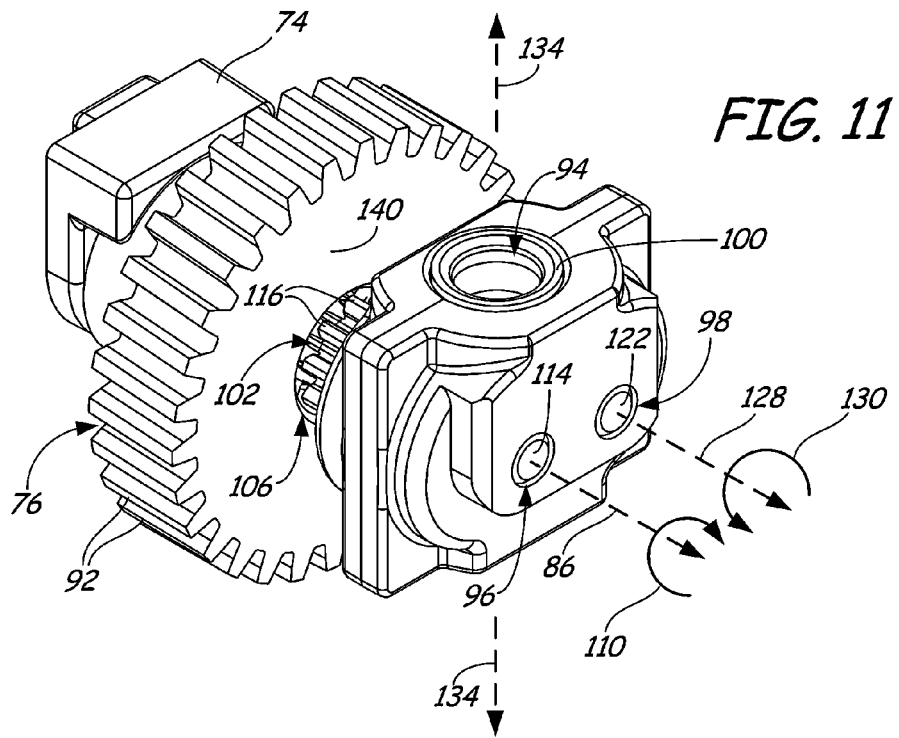
FIG. 11 is a perspective view of the filament drive mechanism.

For example, as shown in FIG. 11, the engagements of drive shafts 102 and 104 with drive block 78 at lateral openings 96 and 98 restrict drive shafts 102 and 104 to rotational movements around fixed axes 86 and 128, where axes 86 and 128 are preferably parallel to each other and are substantially perpendicular to axis 134 of channel 132.

Furthermore, capstan gear 76 preferably includes bearing surface 140, which is a planar surface for receiving and supporting end surface 120 of drive shaft 104 in a low-friction manner. This entraps drive shaft 104 between capstan gear 76 and drive block 78, preventing drive shaft 104 from disengaging apart from drive shaft 102.

Figure 12:
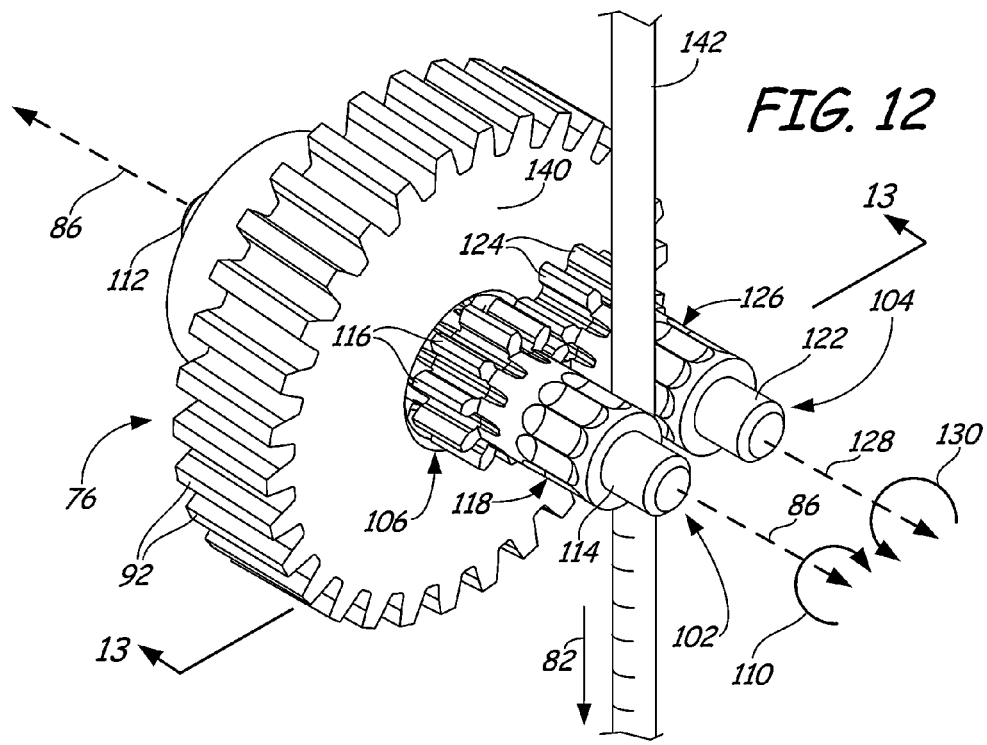
FIG. 12 is a perspective view of a portion of the filament drive mechanism engaged with a consumable filament.

FIG. 12 illustrates an example process for driving a consumable filament (referred to as filament 142) with filament drive mechanism 60, where bearing block 74, drive block 78, and seal ring 100 are omitted for ease of discussion. While a segment of filament 142 extends through channel 132 of drive block 78, engagement surfaces 118 and 126 engage filament 142, as shown. Controller 46 may then direct motor 50 and gear 66 to rotate capstan gear 76 around axis 86 in the direction of arrow 110. The coupling between capstan gear 76 and drive shaft 102 correspondingly rotates draft shaft 102 around axis 86 in the direction of arrow 110 (i.e., the same rotational direction).

While drive shaft 102 rotates, the engagement of gear teeth 116 and 124 forces drive shaft 104 to rotate around axis 128 in the direction of arrow 130, which is a counter direction to arrow 110. The counter rotations of drive shafts 102 and 104 in the respective directions of arrows 110 and 130 drive successive segments of filament 142 downward in the direction of arrow 82 into liquefier assembly 64.

Gear teeth 116 and 124 are preferably engaged with each other at all times in an interlocking manner such that the rotation of drive shaft 102 also rotates drive shaft 104 in the counter direction substantially without any lag time. Moreover, as mentioned above, drive shafts 102 and 104 preferably have the same cross-sectional dimensions at gear teeth 116 and 124 and engagement surfaces 118 and 126. This allows engagement surfaces 118 and 126 to counter rotate at the same rotational rates to generate substantially equal drive pressures on each side of filament 142. This is in comparison to filament drive mechanism 200 (shown in FIG. 1), which includes a single drive wheel 204 and an opposing bearing surface or idler wheel 206.

This driving process of engagement surfaces 118 and 126 is further illustrated in FIG. 13A. As shown, axes 86 and 128 are offset from each other along axis 144 by fixed offset distance 146, where fixed offset distance 146 may vary depending on the cross-sectional dimensions of drive shafts 102 and 104, and the cross-sectional dimensions of filament 142. Fixed offset distance 146 may range, for example, from about 0.1 inches to about 0.2 inches, and more preferably from about 0.14 inches to about 0.17 inches.

Offset distance 146 may be selected to provide a desired pinch force for filament 142. A higher pinch force can reduce slippage and increase the push force into liquefier assembly 64, but is typically limited by acceptable tolerances in the diameter of filament 142 relative to the teeth of engagement surfaces 118 and 126, and by the ductility of the filament material, so as to most effectively meter the filament delivery without breaking filament 142.

Correspondingly, engagement surfaces 118 and 126 are offset from each other by surface offset distance 148, where surface offset distance 148 refers to the minimum average distance between the teeth of engagement surfaces 118 and 126, as taken along axis 144. Surface offset distance 148 is preferably less than the cross-sectional dimensions of filament 142 (e.g., diameter or width, referred to as dimension 150) to allow the teeth of engagement surfaces 118 and 126 to sufficiently engage filament 142.

Surface offset distance 148 may range from about 75% to about 99%, more preferably from about 85% to about 99%, and even more preferably from about 90% to about 95% of dimension 150 of filament 142. For example, for use with a cylindrical filament 142 having an average diameter of about 1.30 millimeters (about 0.050 inches), surface offset distance 148 may range from about 0.975 millimeters to about 1.29 millimeters, more preferably from about 1.10 millimeters to about 1.29 millimeters, and even more preferably from about 1.17 millimeters to about 1.24 millimeters.

The individual teeth of engagement surfaces 118 and 126 are also preferably interlaced such that engagement surfaces 118 and 126 engage filament 142 with at least three teeth for at least 90%, and more preferably for at least 95% of the time while driving filament 142, as shown. This interlacing of engagement surfaces 118 and 126 may be achieved by fabricating drive shaft 102 with the same number of gear teeth 116 and teeth for engagement surface 118 (e.g., ten teeth each), and such that the teeth of engagement surface 118 are radially aligned with gear teeth 118 (as illustrated by radial line 152 in FIG. 13A). Similarly, drive shaft 104 may be fabricated with the same number of gear teeth 124 and teeth for engagement surface 125 (e.g., ten teeth each), and such that the teeth of engagement surface 126 are radially aligned with gear teeth 124 (as illustrated by radial line 154 in FIG. 13A).

The interlaced engagement creates an alternating pattern of the teeth of engagement surfaces 118 and 126, which preferably do not align directly with each-other. If the engagement surfaces teeth were to otherwise align, they may locally compress filament 142 to the point of yield, and potentially sever the continuous filament 142. A conventional filament drive mechanism typically prevents this filament compression with a spring-loading feature. however the compact design of filament drive mechanism 60 effectively prevents the use of a spring-loading feature. Thus, the interlaced engagement provides an error-proof technique for engaging filament 142 in a manner that does not compress filament 142 to the point of yield.

The interlaced engagement also ensures that drive shafts 102 and 104 are continuously engaged with filament 142 at substantially all of the time while driving filament 142. This, in combination with the equal driving pressures of drive shafts 102 and 104 on opposing sides of filament 142, reduces the risk of filament slippage and allows filament 142 to be fed with higher drive pressures, particularly in comparison to filament drive mechanism 200 (shown in FIG. 1). As mentioned above, this provides several advantages for 3D printing operations with system 10.

First, higher drive pressures may allow faster extrusion and acceleration rates, if desired, and reduces sensitivity to back pressures within liquefier assembly 64 (i.e., provides high margins against filament slippage). Additionally, the higher drive pressures allow liquefier assembly 64 to be operated at lower temperatures, such as at an optimal melting temperature for filament 142. This reduces the risk of oozing after an extrusion run, provides greater thermal control over the melting and re-solidification of the filament material in chamber 30, and allows liquefier assembly 64 to include liners that otherwise require higher drive pressures.

Figure 14:
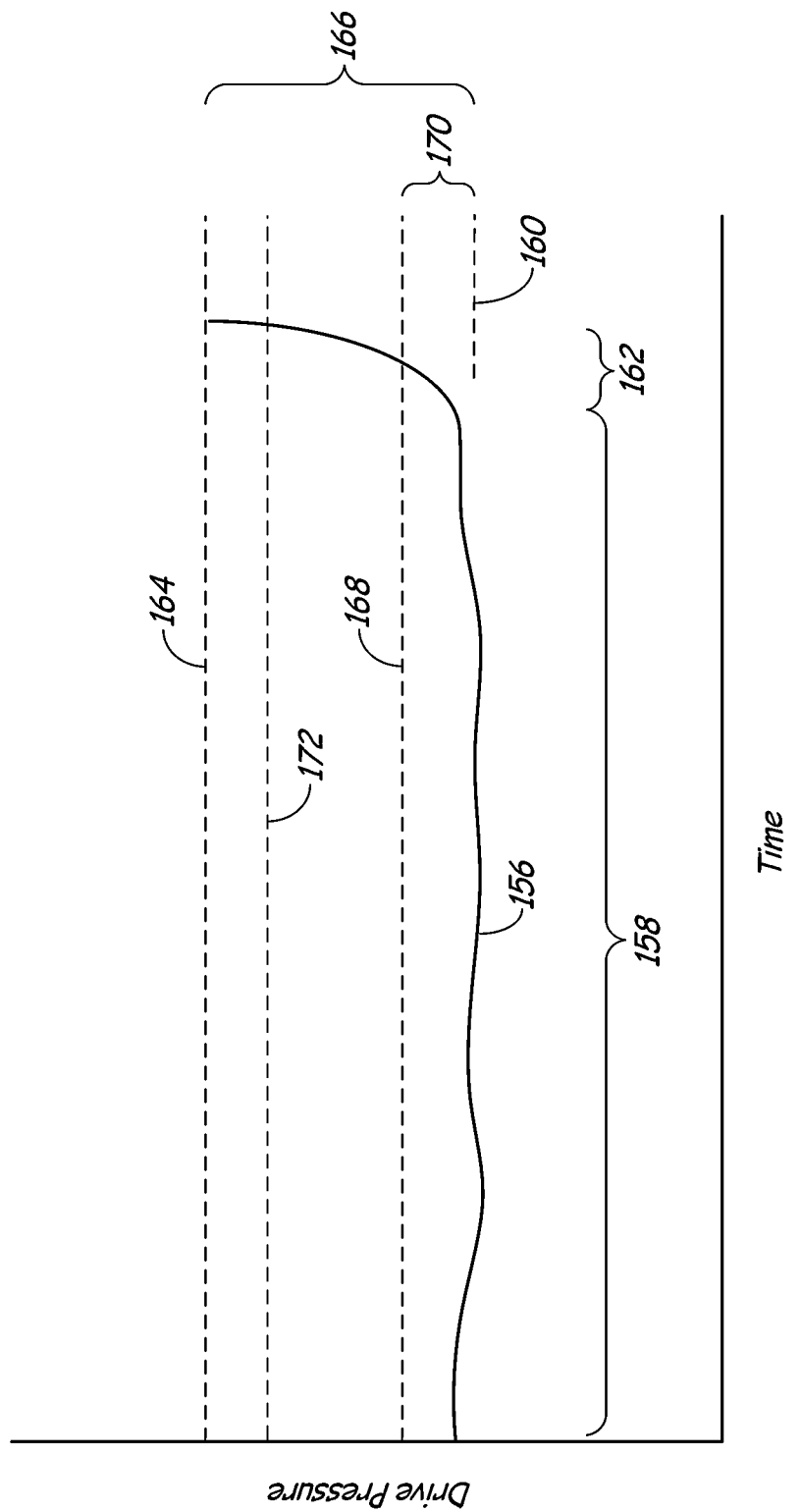
FIG. 14 is a graphical illustration of drive pressure versus time for a printing operation, illustrating high pressure margins attainable with the filament drive mechanism.

Furthermore, the high margins against filament slippage allows system 10 to operate with a stall recovery algorithm, if desired. For example, as shown in FIG. 14, during a printing operation, controller 46 of system 10 (shown in FIG. 2) may operably monitor the drive pressure applied to filament 142, depicted by plot line 156. For example, controller 46 may monitor the electrical current applied to motor 58 while maintaining a desired rotational rate for gear 66 (and drive shafts 102 and 104). Alternatively (or additionally), controller 46 may monitor the rotational rate of gear 66 with an encoder of motor 58, such as a rotary encoder as disclosed in Swanson et al., U.S. Publication No. 2012/0164256.

As discussed above, the monitored drive pressure applied to filament 142 is sensitive to back pressures applied to filament 142. As such, plot line 156 may fluctuate over time due to numerous back pressure factors, such as liquefier temperature variations, part geometry variations, and the like, as depicted by segment 158 of plot line 156, which has an average pressure value 160. However, if the back pressure applied to filament 202 spikes, such as with a clogged tip, the drive pressure applied to filament 142 may accordingly increase quickly from the average pressure value 160, as depicted by segment 162 of plot line 142.

If not accounted for, the increased drive pressure may eventually reach a pressure value that exceeds the grip of engagement surfaces 118 and 126 on filament 142 (referred to a pressure value 164), resulting in filament slippage. However, the three-point interlaced engagement of engagement surfaces 118 and 126 on filament 142, in combination with the equal driving pressures of drive shafts 102 and 104 on opposing sides of filament 142, increases the margin between pressure values 160 and 164, referred to as pressure margin 166.

In comparison, a conventional filament drive mechanism such as filament drive mechanism 200 (shown in FIG. 1) will typically spin out at a substantially lower pressure value, such as at pressure value 168, which provides a pressure margin 170. Unfortunately, in many cases, the lower pressure margin 170 prevents detection of the spin out until after it occurs, preventing the additive manufacturing system from preempting the filament slippage.

The higher pressure margin 166 attainable with filament drive mechanism 60, however, allows controller 46 to detect a back pressure spike prior to reaching the pressure value 164 at which a spin out occurs. As such, controller 46 may continuously compare the monitored drive pressure (e.g., via electrical current and/or encoder rotation), and stall motor 58 when a pressure threshold 172 is reached, where pressure threshold 172 is set at a drive pressure that is greater than the average pressure value 160 and less than the spin out pressure value 164.

Stalling motor 58 prior to filament slippage allows the back pressure issue to be corrected and the printing operation to be recovered, which is not otherwise attainable after filament slippage. For example, during a printing operation, if the pressure fluctuations happen to exceed pressure threshold 172, controller 46 may stall motor 58 until the monitored pressure drops down a level substantially below pressure threshold 172, and then restart motor 58 where it left off. In some embodiments, controller 46 may increase the temperature of liquefier assembly 64 to a predetermined value, and then restart motor 58 where it left off. Additionally, controller 46 may perform other actions during the stall recovery, such as increasing the temperature and/or performing purge operations to unclog any potential blockages, and to bring liquefier assembly 64 back to a known extrusion state. Since filament 142 did not slip from engagement surfaces 118 and 126, the extrusion state of liquefier assembly 64 is still know, allowing the printing operation to continue.

Additionally, the continuous contact between engagement surfaces 118 and 126 with filament 142 allows controller 46 to reverse the rotation of motor 58 to draw filament 142, if desired. In this situation, the reverse rotation of motor 58 correspondingly reverses the rotational directions of drive shafts 102 and 104 around axes 86 and 128. However, drive shafts 102 and 104 continue to rotate in counter directions, where drive shaft 102 rotates in the opposite direction of arrow 110, and drive shaft 104 rotates in the opposite direction of arrow 130.

FIG. 13B further illustrates engagement surface 118 of drive shaft 102, and may also apply in the same manner to engagement surface 126 of drive shaft 104. As shown, engagement surface 118 includes peak edges 118a and valley grooves 118b, which may be milled, cast, injection molded, or the like. The depths of valley grooves 118b may vary depending on the particular radius used to fabricated engagement surface 118. In general, the smaller the radii of valley grooves 118b, the deeper they are relative to peak edges 118a.

In the shown embodiment, peak edges 118a are substantially flat surfaces (i.e., non-sharp edges) having widths of about 0.001 inches, for example, for ease of manufacturing drive shafts 102 and 104. As an example, for a filament having an average diameter of about 0.051 inches (about 1.30 millimeters), engagement surfaces 118 and 126 may each have an average peak outer diameter at peak edges 118a ranging from about 0.11 inches to about 0.14 inches, and an average valley outer diameter at the bases of grooves 118b ranging from about 0.08 inches to about 0.12 inches, where the average valley outer diameter is less than the average peak outer diameter. Correspondingly, gear teeth 116 and 126 may each have an average peak outer diameter ranging from about 0.17 inches to about 0.20 inches. This provides a tolerance build up between the diameter of filament 142 and engagement surfaces 118 and 126 of about +/−0.02 inches or less. In comparison, present conventional extrusion-based additive manufacturing systems typically include a compliant spring-loaded (i.e. non-fixed-center) dual-shaft filament drive, where the engagement surface diameter is on the order of about 0.5 inches (roughly an order of magnitude larger), to accommodate the spring mechanism.

Furthermore, in some embodiments, the teeth of one or both of engagement surfaces 118 and 126 (e.g., peak edges 118a) may be oriented at a negative rake angle. In these embodiments, engagement surfaces 118 and 126 may press blunt grooves into filament 142 when engaged, which can reduce drive power requirements and improve feeding reliability.

Accordingly, filament drive mechanism 60 is suitable for use in printing 3D parts with higher drive pressures, lower liquefier temperatures, and stall recoveries. Additionally, filament drive mechanism 60 has a compact design, allowing it to be incorporated as a sub-component in a print head (e.g., print head 18), consumable assembly, coupling adapter, and/or any other suitable location along the filament pathway.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18 and head gantry 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

Filament drive mechanism 60 may also be alternatively (or additionally) installed at any suitable location along the filament pathway. For example, consumable assemblies 12 may each include a coupling adapter (not shown), which is configured to engage a reciprocating mating panel of system 10 that is remote from head carriage 36, as discussed in U.S. patent application Ser. No. 13/334,934. In this embodiment, the coupling adapter may include filament drive mechanism 60 may be a sub-component of the coupling adapter for feeding filament 142 from consumable assembly 12 to system 10. In another example, filament drive mechanism 60 may be installed in container portion 14 for feeding filament 142 from consumable assembly 12 to system 10. Moreover, system 10 and/or consumable assemblies 12 may include multiple filament drive mechanisms 60 located along the filament pathways.

Suitable consumable filaments for filament 142 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495. Furthermore, the consumable filaments may each include encoded markings, as disclosed in Batchelder et al., U.S. Patent Application Publication Nos. 2011/0117268, 2011/0121476, and 2011/0233804, which may be used with sensor assemblies 44 of system 10; and/or topographical surfaces patterns (e.g., tracks) as disclosed in Batchelder et al., U.S. Pat. No. 8,236,227. The length of filament 142 may be any suitable length, and is preferably more than about 100 feet.

Filament 142 desirably exhibits physical properties that allow it to be used as a consumable material in system 10. In particular, filament 142 is desirably flexible along its length to allow it to be retained in container 14 and to be fed through guide tube 16 without plastically deforming or fracturing. Additionally, filament 142 also desirably exhibits low compressibility such that its axial compression doesn't cause filament 142 to be seized within a liquefier of print head 18.

In the shown embodiment, filament 142 has a substantially cylindrical geometry (i.e., a substantially circular cross section). In this embodiment, filament 142 may have an average diameter ranging from about 1.0 millimeter (about 0.04 inches) to about 3.0 millimeters (about 0.12 inches). In some embodiments, the average diameter of filament 142 preferably ranges from about 1.0 millimeter (about 0.04 inches) to about 1.5 millimeters (about 0.06 inches). In other embodiments, the average diameter of filament 142 preferably ranges from about 1.5 millimeters (about 0.06 inches) to about 2.0 millimeters (about 0.08 inches). As used herein, the term "average diameter" of a filament is an average based on a 100-foot segment length of the filament. The above-discussed ranges for the average diameter of filament 142 may alternatively be referred to based on the average cross-sectional area of filament 142.

Alternatively, filament 142 may have a non-cylindrical geometry, such as a ribbon filament as disclosed in Batchelder et al., U.S. Pat. No. 8,221,669. In this embodiment, print head 18 may include a ribbon liquefier assembly as disclosed in Batchelder et al., U.S. Application Publication No. 2011/0074065; and in Swanson et al., U.S. Application Publication No. 2012/0070523. In the ribbon-filament embodiment, filament 142 may have an average width and an average thickness, where the average width for ribbon filament 142 may range from about 1.0 millimeter (about 0.04 inches) to about 10.2 millimeters (about 0.40 inches), and more preferably from about 2.5 millimeters (about 0.10 inches) to about 7.6 millimeters (about 0.30 inches). The average thickness for ribbon filament 142 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

As used herein, the terms "average width" and "average thickness" of a ribbon filament are each an average based on a 100-foot segment length of the ribbon filament. The above-discussed ranges for the average width and the average thickness may alternatively be referred to based on the average cross-sectional area of ribbon filament 142. Furthermore, the cross-sectional dimensions of ribbon filament 142 for the ribbon-filament embodiment may also be referred to based on the cross-sectional aspect ratio of the average width to the average thickness. For example, the cross-sectional aspect ratio (width-to-thickness) may range from about 2:1 to about 20:1. In some embodiments, the cross-sectional aspect ratio ranges from about 2.5:1 to about 10:1, and in further embodiments from about 3:1 to about 10:1.

Although the present disclosure has been described with reference to preferred embodiments, workers skilled in the art will recognize that changes may be made in form and detail without departing from the spirit and scope of the disclosure.

The invention claimed is:

1. A filament drive mechanism for use with an additive manufacturing system, the filament drive mechanism comprising:
    a first drive shaft having a first rotational axis, and comprising:
        first gear teeth extending around the first rotational axis; and
        a first engagement surface extending around the first rotational axis, wherein the first engagement surface comprises a first plurality of spaced apart filament engagement surfaces substantially parallel to the first rotational axis; and
    a second drive shaft having a second rotational axis that is substantially parallel to and fixed relative to the first rotational axis, wherein the second drive shaft comprises:
        second gear teeth extending around the second rotational axis, wherein the second gear teeth are engaged with the first gear teeth; and
        a second engagement surface extending around the second rotational axis, wherein the second engagement surface comprises a second plurality of spaced apart filament engagement surfaces substantially parallel to the second rotational axis and is substantially aligned with the first engagement surface of the first drive shaft such that the first and second plurality of spaced apart filament engagement surfaces are configured for engaging a filament therebetween by at least partially compressing a filament surface at one or more locations concurrently.

2. The filament drive mechanism of claim 1, and further comprising a drive block, wherein the drive block comprises:
   a channel configured to receive the filament; and
   a pair of lateral openings extending substantially perpendicular to the channel, wherein the first and second engagement surfaces are respectively disposed in the pair of lateral openings.

3. The filament drive mechanism of claim 1, wherein the first plurality of paced apart filament engagement surfaces comprises a first set of teeth, wherein the second plurality of spaced apart filament engagement surfaces comprises a second set of teeth, and wherein the first set of teeth and the second set of teeth are configured to engage the filament with at least an interlaced engagement.

4. The filament drive mechanism of claim 3, wherein the first set of teeth are radially aligned with the first gear teeth, and wherein the second set of teeth are radially aligned with the second gear teeth.

5. The filament drive mechanism of claim 1, wherein the first and second engagement surfaces are offset along an axis by a minimum distance ranging from about 0.975 millimeters to about 1.29 millimeters, the axis being substantially perpendicular to the first and second rotational axes.

6. The filament drive mechanism of claim 1, wherein the first and second drive shafts have substantially the same cross-sectional dimensions at the first gear teeth and the second gear teeth, and at the first and second engagement surfaces.

7. The filament drive mechanism of claim 1, and further comprising a capstan gear having perimeter gear teeth, wherein the first drive shaft extends axially from the capstan gear.

8. The filament drive mechanism of claim 1, wherein the first rotational axis and the second rotational axis are each a substantially fixed axis.

9. A print head for use with an additive manufacturing system, the print head comprising:
   a cartridge portion;
   a liquefier assembly extending from the cartridge portion; and
   a filament drive mechanism disposed in the cartridge portion, the filament drive mechanism comprising:
      a first drive shaft extending along a first rotational axis and having a first plurality of spaced apart filament engagement surfaces positioned substantially parallel to the first rotational axis; and
      a second drive shaft engaged with the first drive shaft and extending along a second rotational axis that is substantially parallel to and fixed relative to the first rotational axis, the second drive shaft having a second plurality of spaced apart filament engagement surfaces that are positioned substantially parallel to the second rotational axis and substantially aligned with the first plurality of spaced apart filament engagement surfaces of the first drive shaft wherein the first and second drive shafts are configured to engage a filament therebetween by compression of a filament surface at one or more opposing points along a length of the filament corresponding to one or more of the first and second pluralities of spaced apart filament engagement surfaces to feed the filament to the liquefier assembly.

10. The print head of claim 9, and further comprising a drive block, wherein the drive block comprises:
    a first opening;
    a second opposing opening from the first opening along a channel axis;
    a channel extending along the channel axis between the first and second openings, the channel being configured to receive the filament;
    a third opening substantially perpendicular to the channel axis, wherein the third opening intersects the channel and retains the first engagement surface of the first drive shaft; and
    a fourth opening substantially perpendicular to the channel axis and substantially parallel to the third opening, wherein the fourth opening intersects the channel adjacent to the third opening and retains the second engagement surface of the second drive shaft.

11. The print head of claim 9, wherein the second drive shaft is engaged with the first drive shaft in manner such that a rotation of the first drive shaft in a first rotational direction around the first rotational axis forces the second drive shaft to rotate in a second rotational direction around the second rotational axis that is counter to the first rotational direction.

12. The print head of claim 9, wherein the first engagement surface comprises a first set of teeth, wherein the second engagement surface comprises a second set of teeth, and wherein the first set of teeth and the second set of teeth are configured to engage the filament with an interlaced engagement.

13. The print head of claim 9, wherein the first plurality of spaced apart filament engagement surfaces comprises first gear teeth extending around the first rotational axis, wherein the second plurality of spaced apart filament engagement surfaces comprises second gear teeth extending around the second rotational axis, and wherein the second drive shaft is engaged with the first drive shaft by an engagement between the first gear teeth and the second gear teeth.

14. The print head of claim 12, wherein the first engagement surface comprises the same number of teeth as the first gear teeth, and wherein the teeth of the first engagement surface are radially aligned with the first gear teeth.

15. A method for printing a three-dimensional part from a part material with an additive manufacturing system, the method comprising:
    providing a first draft shaft and a second drive shaft engaged with each other, and each drive shaft comprising a plurality of spaced apart filament engagement surfaces, the spaced apart filament engagement surfaces positioned parallel to a drive axis of the respective drive shaft and the plurality of spaced apart filament engagement surface are configured to engage a filament by at least partially compressing at least one location on opposing sides of a filament of the part material;
    rotating the first drive shaft around a first axis in a first rotational direction;
    rotating the second drive shaft by the engagement between the first and second drive shafts, wherein the second drive shaft rotates around a second axis in a second rotational direction that is counter to the first rotational direction, the second axis being substantially parallel and fixed relative to the first axis, and wherein the rotations of the first and second drive shafts drive the engaged filament;

directing the driven filament into a liquefier assembly of a print head retained by the additive manufacturing system;

melting the filament in the liquefier assembly to provide a molten part material; and extruding the molten part material from the liquefier assembly to print the three-dimensional part in a layer-by-layer manner.

16. The method of claim 15, and further comprising:

providing electrical current to a motor; and rotating a motor gear based on the electrical current received by the motor, wherein the rotation of the motor gear operably rotates the first drive shaft around the first axis in the first rotational direction.

17. The method of claim 16, wherein the motor gear has a threaded surface engaged with a capstan gear, the first drive shaft extending axially from the capstan gear, and wherein the rotation of the motor gear rotates the capstan gear around the first axis in the first rotational direction.

18. The method of claim 16, and further comprising operably monitoring a drive pressure applied to the filament by the first and second drive shafts with a controller of the additive manufacturing system.

19. The method of claim 18, wherein operably monitoring the drive pressure comprises monitoring operating conditions of the motor that are selected from the group consisting of monitoring a rotational rate of the motor, monitoring the received electrical current to the motor, and combinations thereof.

20. The method of claim 18, and further comprising stalling the motor when the operably monitored drive pressure exceeds a threshold value, wherein the threshold value corresponds to a drive pressure that is lower than a pressure at which the filament slips from the first and second drive shafts.

* * * * *